P. NELSON.
PEELING KNIFE.
APPLICATION FILED SEPT. 18, 1911.
1,049,515.
Patented Jan. 7, 1913.
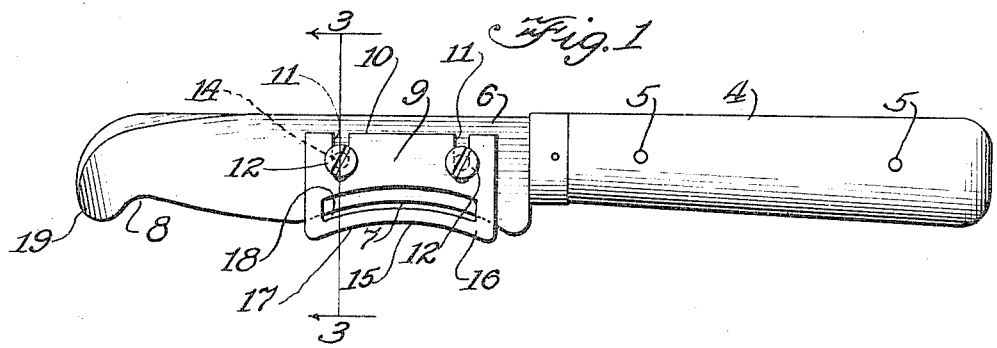
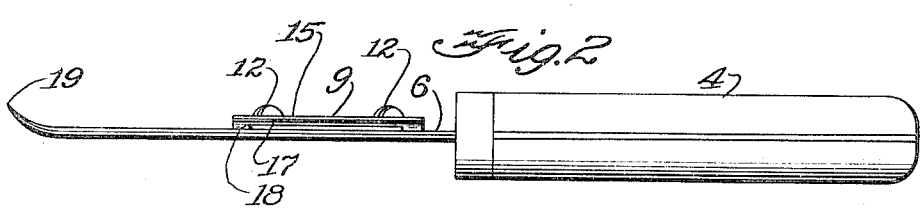
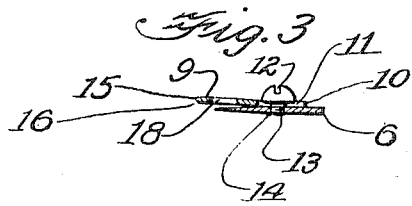
Witnesses:—
Vnw. H. Yagle
J. G. Wooden
Inventor:—
Peter Nelson
by Carl Rrover
Atty.

UNITED STATES PATENT OFFICE.

PETER NELSON, OF CHICAGO, ILLINOIS.

PEELING-KNIFE.

1,049,515.  Specification of Letters Patent.  Patented Jan. 7, 1913.

Application filed September 18, 1911. Serial No. 649,956.

*To all whom it may concern:*

Be it known that I, PETER NELSON, of the city of Chicago, county of Cook, and State of Illinois, have invented certain new and useful Improvements in Peeling-Knives, of which the following is a specification.

The object of this invention is to provide a peeling knife by which potatoes, apples and other vegetables and fruits may quickly be peeled, even by the inexperienced, without waste, and which in other ways is better adapted for peeling purposes than the ordinary knife.

In the drawings Figure 1. is a side elevation of my knife; Fig. 2. shows my knife viewed against the cutting edge; and Fig. 3. is a cross section of the knife in the plane indicated by line 3—3 in Fig. 1.

Referring to the drawings, between handle plates 4 is fastened, by rivets 5, knife-blade 6, the cutting edge of which is formed with two curved recesses, 7 and 8. Opposite recess 7 (the one nearest to the handle) a guard 9 is fastened to blade 6. The back 10 of this guard is provided with transverse slots 11, straddled by heads 12 of setscrews 13 which are threaded into openings 14 in blade 6 for the purpose of adjustably fastening guard 9 to blade 6. Edge 15 of guard 16 is placed at a slight angle to back 10, so as to be distanced somewhat from the cutting edge of blade 6; is formed with a curved recess 17 corresponding in outline to recess 7; and is provided, parallel with recess 17, with slot 18. Point 19 of blade 6 is curved sideward toward the same side of blade 6 to which guard 9 is attached, so as to form a hook more convenient for the removal of the eyes of potatoes, etc., without waste, than the ordinary flat knife point. Manifestly my knife can readily be constructed both for right handed and left-handed use.

While ordinarily that portion of the cutting edge of blade 6 will be used in peeling which is comprised in recess 7 and protected by guard 9, recourse may readily be had to the portion comprised in recess 8 when the shape of the article to be peeled does not allow of the convenient use of the guard-protected part of the cutting edge, and likewise when it is desired to cut off larger portions of, or to divide, the article.

The curvature of the cutting edge of blade 6 in recesses 7 and 8 makes it practicable to peel with each cut a larger portion of the surface of round or semi-round articles without waste than is possible with a straight-edge blade. Guard 9, while permitting the ready escape of the peelings through slot 18, prevents deep and wasteful cutting in peeling, and also largely prevents accidental cutting of the operator's fingers, and hence permits faster work.

I claim:—

1. In peeling knives the combination, with a handle, of a blade having a curved recess in its cutting edge near the handle, and another curved recess in its cutting edge near its outer end, and having said outer end rounded, upturned, and projecting forward of the adjacent portion of the cutting edge; a curved guard conforming in outline to the first mentioned curved recess; and means to adjustably fasten the guard to the blade adjoining such recess; substantially as and for the purpose described.

2. In peeling knives the combination, with a handle, of a blade having a curved recess in its cutting edge near the handle, another curved recess in its cutting edge near its outer end, a substantially straight cutting edge, of a length about equal to the cutting edge of the first named recess, located between said recesses, and its end rounded, upturned, and projecting forward of the adjacent portion of the cutting edge; a curved guard conforming in outline to the first mentioned curved recess; and means to fasten the guard to the blade adjoining such recess; substantially as and for the purpose described.

PETER NELSON.

Witnesses:
CARL STROVER,
FRANK PETRICH.